June 16, 1936.  M. F. MORAN  2,044,096
DRY CLEANING SYSTEM
Filed May 27, 1935
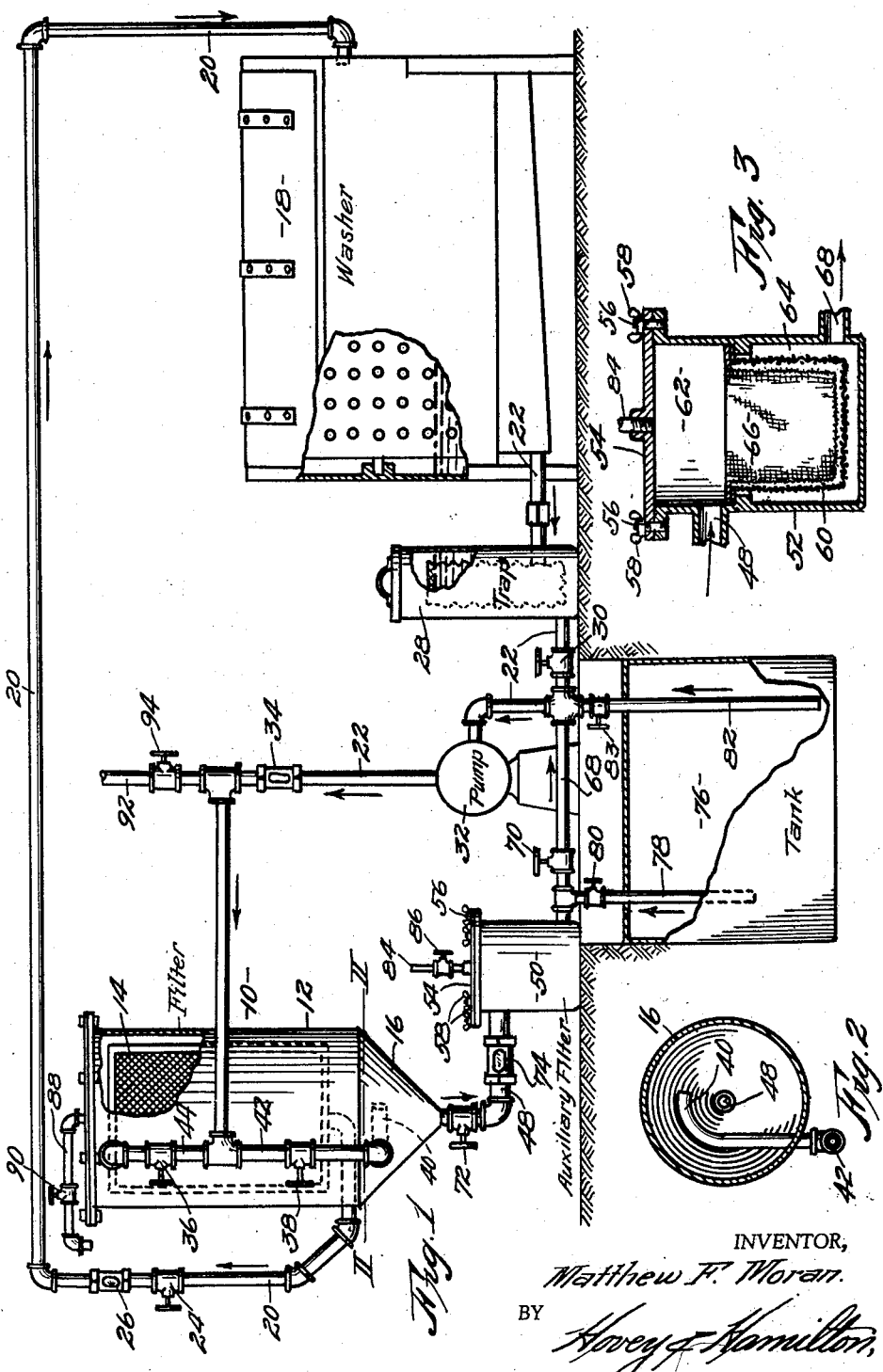
INVENTOR,
Matthew F. Moran.
BY
Hovey & Hamilton,
ATTORNEYS.

Patented June 16, 1936

2,044,096

UNITED STATES PATENT OFFICE 2,044,096

DRY CLEANING SYSTEM

Matthew F. Moran, Kansas City, Mo.

Application May 27, 1935, Serial No. 23,682

2 Claims. (Cl. 210—150)

This invention relates to improvements in dry cleaning systems and more particularly to dry cleaning systems having means for cleaning the soiled cleaning fluid coming from the washer without removing it from the system.

In dry cleaning systems now in general use it is common practice to use leaf filters having screens coated with an inert, pulverized, absorbent material to aid in removing the foreign matter from the cleaning solvent used in the system. These screens become loaded and must be cleaned at intervals and a new coat of filter aid applied. The method of handling this filtering problem has been to scrape the filter aid, together with the accumulated foreign matter, from the screen and permit it to collect in the bottom of the filter by settling, and at intervals remove the accumulated sludge, together with the solvent, from the filter and clean it by special treatment which requires considerable time and expense.

Furthermore, the settling process of removing the accumulated materials from the solvent would remove only a part of the objectionable matter from the solvent circulating through this system, thus making it impossible to properly clarify the liquid and to permit the re-coating of the filter screen with filter aid without the collection of objectionable solid matter yet remaining in suspension in the cleaning liquid.

Also, with this settling system now in general use the liquid enters the top portion of the filter, in order to give the filter aid a better chance to coat the screen without settling to the bottom of the filter.

Many other difficulties are now encountered, including the presence of cloudy solvent in the washer at the time of re-coating the filter screens, loss of time and expense. This invention overcomes these difficulties, and the principal object is to provide a dry cleaning system having a washer, a filter, an auxiliary filter, and valve-controlled interconnecting pipes, whereby the filter may be selectively placed in open circuit with the washer or the auxiliary filter.

Another object of the invention is the provision of a dry cleaning system having means whereby the cleaning fluid is selectively injected into either the upper or lower portions of the filter.

Other objects of this invention are efficiency and economy of operation, simplicity and convenience of construction and adaptability to a large number of uses.

Reference will now be had to the drawing, wherein:

Figure 1 is a side elevation of a dry cleaning system partly in section, embodying this invention.

Figure 2 is a horizontal, sectional view taken on line II—II of Fig. 1, and,

Figure 3 is an enlarged, central, sectional view of the auxiliary filter.

Like reference characters indicate similar parts throughout the several views and the numeral 10 designates a filter of any suitable type, which is adapted to clarify the solvent or cleaning fluid, such as gasoline, which is used in the system.

The filter shown in the drawing is of the leaf type, which consists of a cylindrical casing 12, in which is mounted filter leaves 14. The lower portion 16 of the casing is preferably frusto-conical in shape. A clothes-containing machine 18, which is commonly called a washer, is placed in a suitable position relative to the filter and is interconnected therewith by means of pipe 20. This pipe 20 is adapted to receive the clear solvent from the filter leaf 14 and direct it to the washer. Also, an outlet pipe 22 from the lower portion of the washer communicates with the casing of filter 10, thereby completing a closed circuit in which the washer and filter are in series. Pipe 20 is provided with a control valve 24 and a sight glass 26.

Interposed in pipe 22 is a trap 28, valve 30, pump 32, sight glass 34, valve 36 and valve 38. During the clothes cleaning operation the used solvent will pass from the lower portion of washer 18 through pipe 22 and its associated members to the bottom portion of filter 10, where it will be directed by nozzle 40 to cause a whirling of the solvent contained within the filter, thereby preventing settling of all solid substances contained within the solvent and directing them to the filter leaves where they will be collected, thus delivering a clear solvent into pipe 20 where it will again be delivered to the washer. It will be observed that the two arms 42 and 44 of pipe 22 communicate respectively with the lower and upper portion of the filter casing 12, thus making it possible by means of valves 36 and 38 to direct the solvent delivered by pump 32 either adjacent the top of said filter leaves or to the conical portion 16 of the filter.

Communicating with the lower extremity of filter 10 by means of an outlet or drain pipe 48 is an auxiliary filter 50. This auxiliary filter is preferably positioned below filter 10 so that liquid being drained from 10 will enter the top portion of the auxiliary filter by gravity. As shown in Fig. 3, this auxiliary filter comprises a casing 52, having an open top which is provided with a removable closure 54. This closure is held in operative position by means of bolts 56 and wing nuts 58.

Mounted in casing 52 below pipe 48 is a screen support 60, which serves as a partition to form compartments 62 and 64 in casing 52. This screen support is adapted to secure filter bag 66 in operative position during the filtering process. Pipe 68 communicates with compartment 64 adjacent the bottom of 52 and interconnects with pipe 22 between the washer 18 and pump 32, and is provided with a control valve 70. Drain pipe 48 is also provided with valve 72 and sight glass 74. It will be observed by referring to Fig. 3 that the filter bag 66 may be removed through the open upper end of 52 after the closure 54 has been removed, thus making it possible to quickly clean the filter bag and replace it for continued use. A storage tank 76 positioned beneath auxiliary filter 50 is adapted to receive liquid from the auxiliary filter through a pipe 78 interconnected with pipe 68 and provided with valve 80.

For removing liquid from storage tank 76, a pipe 82 which extends to a point adjacent the bottom of the storage tank, communicates with pipe 22 between valves 70 and 30 and is provided with a control valve 83. An air vent pipe 84 communicates with the upper compartment 62 of the auxiliary filter and is provided with a cutoff valve 86. Filter 10 is also provided with an air vent pipe 88 which has a control valve 90.

The direction of flow of the solvent in the system as described above is continued so long as the liquid passing from the filter to the washer through pipe 20 continues clean, and the pressure in the system does not become excessive. This can be determined by observing the flowing liquid through sight glass 26 and the operation of the pump. Also, the condition of the liquid passing from the washer to the filter may be determined through sight glass 34.

When the pressure in the system becomes too great, due to the accumulation of material on the filter screen, valves 28, 30 and 38 are closed and valves 36, 72 and 70 are opened, thereby closing the washing circuit and opening the filtering circuit. The leaf filter screens which previously had been treated with a suitable filter aid such as an inert, powdered, absorbent material are scraped to remove said filter aid and accumulated waste material therefrom. An example of a manner of scraping filter leaves 14 may be found in my United States Letters Patent No. 1,959,491, dated May 22, 1934, and relating to improvements in Filter screen wiper. This material when scraped loose from the screen tends to move downwardly in casing 12, but will not necessarily be broken up and carried from the filter until the pump is set in motion to draw the liquid from the lower portion of filter 12 through auxiliary filter 50, pipe 68, thence through pipe 22 in which pump 32 is positioned, thence through the upper arm 44 of pipe 22 and into the filter adjacent the top of the filter leaf 14, thereby agitating the liquid throughout the filter chamber, thus causing the breaking up of the caked material which had previously been scraped from the screens and causing it to flow with the outgoing liquid through pipe 48 into the auxiliary filter 50 where it will be retained in the filter bag 66, while the filtered liquid will pass through pipe 68, pipe 22 and back to the filter 10. This process will be continuous until such time as the liquid passing by sight glass 74 is shown to be clear, thus indicating that all foreign substances have been filtered from the cleaning solvent and necessarily are impounded in the filter bag 66.

Valve 72 is now closed and the pump continues its operation to remove the solvent from auxiliary filter 50, thus leaving the accumulated foreign matter in substantially a dry state in filter bag 66. During this operation valve 86 is opened to allow air to enter auxiliary filter 50, thus preventing the formation of a vacuum therein. After this operation is completed, valves 70 and 36 are closed, valves 30 and 38 are opened, thereby opening the washing circuit. At this stage a new supply of filter aid may be deposited in the solvent and the pump set in motion to cause a circulation of the solvent, together with the filter aid, which will accumulate in a thin layer over the surface of the filter leaf 14. When this operation has been completed, the system is now in condition for further washing.

With valves 72 and 70 now closed, the closure 54 is removed from auxiliary filter 50, bag 66 is removed and cleaned and again returned to position ready for another filtering operation. It may be possible to filter several batches through the filter bag 66 before it will need to be cleaned. However, this depends entirely upon the nature of the materials being washed and the amount of foreign matter deposited in the solvent.

Under certain conditions it may be desirable to simply drain the excess solvent from the auxiliary filter and this can be accomplished by opening valves 80 and 86, thus permitting liquid in 50 to pass into the storage tank 76. Furthermore, all of the liquid contained in filter 10 and auxiliary filter 50 might likewise be drained into the storage tank 76 through pipe 78 and then pumped back into the system through pipe 82 by simply closing valves 70 and 30 and operating pump 32.

Provision is made for passing the liquid from the washer or filter directly to a still or treating tank through pipe 92, which is normally closed by means of valve 94. To keep the cleaning liquid in proper condition it is necessary that it be chemically or heat treated and it is for this purpose that provision is made for delivering it through pipe 92, after it has been passed through the auxiliary filter or after it has been used in the washer.

It is apparent that the filtering means provided in this dry cleaning system is adapted to be operated to thoroughly clean the liquid cleaner without removing it from the system and also to do this without interfering with the washing process for any material length of time.

Having thus described the invention, what is claimed as new and desired to be secured by Letters Patent is:

1. Fluid treating apparatus for dry cleaning systems comprising a main filter casing having filter leaves therein with powdered absorbent material thereon; an auxiliary filter below the main filter for removing the spent inert material from the stream of fluid passing by gravity from the main filter to the auxiliary filter after the same has been removed from the filter leaves; a drain pipe interconnecting the bottom of the main filter and said auxiliary filter; and a pipe interconnecting the auxiliary filter and the main filter for returning the fluid to the main filter after passing through the auxiliary filter, said last mentioned pipe having branches extending therefrom in communication with the upper and lower portions respectively of the main filter casing whereby to direct the returned fluid against the filter leaves or into the absorbent material removed from said filter leaves to agitate the same, said last mentioned pipe having a pump in connection therewith to force the fluid from the auxiliary filter to the said main filter casing above the drain pipe, said branches each having a valve therein to selectively cause the fluid to enter the said casing of the main filter at the locations set forth.

2. Fluid treating apparatus for dry cleaning systems comprising a main filter serving to act upon the solvent passing through the system, having filter leaves in the upper portion of the main filter casing; an auxiliary filter having an open mouth bag suspended therein and dividing the same into an upper and lower compartment; a frusto-conical bottom forming a part of the main filter; a drain pipe interconnecting the lowermost point of said bottom and the upper compartment formed in the auxiliary filter whereby to carry particles to the auxiliary filter from the filter leaves of the main filter during the cleaning operation of the filter; and a pipe interconnecting the lower compartment of the auxiliary filter and the said main filter for returning the solvent filtered by the bag in the auxiliary filter to the said main filter, said last mentioned pipe having a pump therein and provided with a branch in communication with the upper and lower portions respectively of the main filter, said auxiliary filter being below the said main filter whereby particles of the absorbent material and solvent pass by gravity from the latter to the former, the open mouth bag within said auxiliary filter serving to hold the said particles of absorbent material as the solvent passes through the bag into the lower compartment of the auxiliary filter for returning to the main filter, said upper branch having the end thereof directed toward said filter leaves within the main filter whereby said returning solvent bathes the said filter leaves to aid in cleaning when returned to the main filter through the upper branch, said lower branch terminating within the main filter whereby said returning solvent agitates the material in the lower part of the main filter when returnd to the main filter through the lower branch, each of said branches having a control valve therein.

MATTHEW F. MORAN.